(12) United States Patent
Colgate et al.

(10) Patent No.: US 8,780,053 B2
(45) Date of Patent: Jul. 15, 2014

(54) VIBRATING SUBSTRATE FOR HAPTIC INTERFACE

(75) Inventors: James Edward Colgate, Evanston, IL (US); Michael Peshkin, Evanston, IL (US); Laura Winfield Alexander, Sunbury, OH (US); Mario Schirru, Rome (IL)

(73) Assignee: Northwestern University, Evanston, IL (US)

( * ) Notice: Subject to any disclaimer, the term of this patent is extended or adjusted under 35 U.S.C. 154(b) by 901 days.

(21) Appl. No.: 12/383,120

(22) Filed: Mar. 19, 2009

(65) Prior Publication Data

US 2009/0284485 A1    Nov. 19, 2009

Related U.S. Application Data

(63) Continuation-in-part of application No. 11/726,391, filed on Mar. 21, 2007.

(60) Provisional application No. 61/070,212, filed on Mar. 20, 2008.

(51) Int. Cl.
*G09G 5/00*    (2006.01)

(52) U.S. Cl.
USPC ......... 345/173; 345/174; 345/177; 178/18.04

(58) Field of Classification Search
USPC .................. 345/173–179; 178/18.01–18.09
See application file for complete search history.

(56) References Cited

U.S. PATENT DOCUMENTS

| | | | |
|---|---|---|---|
| 4,352,961 A | 10/1982 | Kumada et al. | |
| 4,686,407 A | 8/1987 | Ceperley | 310/323 |
| 4,812,698 A | 3/1989 | Chida et al. | |
| 5,055,962 A | 10/1991 | Peterson et al. | |
| 5,184,319 A | 2/1993 | Kramer | |
| 5,235,225 A | 8/1993 | Colgate et al. | |
| 5,561,337 A | 10/1996 | Toda | |
| 5,587,937 A | 12/1996 | Massie et al. | |
| 5,631,861 A | 5/1997 | Kramer | |
| 5,673,041 A | 9/1997 | Chatigny et al. | |
| 5,709,219 A | 1/1998 | Chen et al. | |
| 5,760,530 A | 6/1998 | Kolesar | |

(Continued)

FOREIGN PATENT DOCUMENTS

| | | |
|---|---|---|
| JP | 2001-255993 | 9/2001 |
| JP | 2006-163206 | 6/2006 |
| JP | 2006-228151 | 8/2006 |
| JP | 2008-287402 | 11/2008 |

OTHER PUBLICATIONS

Toshio Watanabe and Sheigehisa Fukui, A Method for Controlling Tactile Sensation of Surface Roughness Using Ultrasonic Vibration, IEEE International Conference on Robotics and Automation, 1995, pp. 1134-1139.

(Continued)

*Primary Examiner* — Jennifer Nguyen
(74) *Attorney, Agent, or Firm* — Cook Alex Ltd.

(57) ABSTRACT

A haptic device is provided having a substrate with a touch surface and one or more actuators for vibrating the substrate in a multiplicity of higher resonant modes, each of which has a high enough frequency to be inaudible and high enough amplitude to create a friction reduction effect at a plurality of vibrating regions on the substrate touch surface.

32 Claims, 7 Drawing Sheets

(56) References Cited

U.S. PATENT DOCUMENTS

| | | | |
|---|---|---|---|
| 6,042,555 A | 3/2000 | Kramer et al. | |
| 6,059,506 A | 5/2000 | Kramer | |
| 6,337,678 B1 | 1/2002 | Fish | |
| 6,351,054 B1 | 2/2002 | Cabuz et al. | |
| 6,429,846 B2 | 8/2002 | Rosenberg et al. | |
| 6,570,299 B2 | 5/2003 | Takeshima et al. | |
| 6,819,990 B2 | 11/2004 | Ichinose | |
| 6,970,160 B2 | 11/2005 | Mulligan et al. | |
| 6,979,164 B2 | 12/2005 | Kramer | |
| 7,148,875 B2 | 12/2006 | Rosenberg | |
| 7,271,707 B2 | 9/2007 | Gonzales | |
| 7,271,945 B2 | 9/2007 | Hagood et al. | |
| 7,742,036 B2 * | 6/2010 | Grant et al. | 345/156 |
| 7,952,498 B2 * | 5/2011 | Higa | 341/34 |
| 2001/0026266 A1 | 10/2001 | Schena et al. | |
| 2001/0043847 A1 | 11/2001 | Kramer | |
| 2002/0186208 A1 * | 12/2002 | Feldman et al. | 345/173 |
| 2003/0025721 A1 | 2/2003 | Clapper et al. | |
| 2003/0038645 A1 | 2/2003 | Ishii | |
| 2003/0038776 A1 | 2/2003 | Rosenberg et al. | |
| 2003/0076297 A1 | 4/2003 | Hasser | |
| 2003/0151597 A1 | 8/2003 | Roberts et al. | |
| 2003/0179190 A1 | 9/2003 | Franzen | |
| 2003/0193475 A1 | 10/2003 | Rosenberg et al. | |
| 2004/0108992 A1 | 6/2004 | Rosenberg | |
| 2004/0237669 A1 | 12/2004 | Hayward et al. | |
| 2005/0017947 A1 | 1/2005 | Shahoian et al. | |
| 2005/0030292 A1 | 2/2005 | Diederiks | |
| 2005/0037862 A1 | 2/2005 | Hagood et al. | |
| 2005/0057527 A1 * | 3/2005 | Takenaka et al. | 345/173 |
| 2005/0173231 A1 | 8/2005 | Gonzales | |
| 2006/0097996 A1 * | 5/2006 | Tabata | 345/173 |
| 2006/0115348 A1 | 6/2006 | Kramer | |
| 2006/0187201 A1 | 8/2006 | Rosenberg et al. | |
| 2006/0209037 A1 | 9/2006 | Wang et al. | |
| 2006/0244732 A1 | 11/2006 | Geaghan | |
| 2006/0279548 A1 | 12/2006 | Geaghan | |
| 2006/0284839 A1 | 12/2006 | Breed et al. | 345/156 |
| 2007/0146317 A1 | 6/2007 | Schena | |
| 2007/0182708 A1 | 8/2007 | Poupyrev et al. | |
| 2007/0236450 A1 | 10/2007 | Colgate et al. | |
| 2007/0236474 A1 * | 10/2007 | Ramstein | 345/173 |
| 2008/0060856 A1 | 3/2008 | Shahoian et al. | |
| 2008/0062143 A1 | 3/2008 | Shahoian et al. | |
| 2008/0062144 A1 | 3/2008 | Shahoian et al. | |
| 2008/0062145 A1 | 3/2008 | Shahoian et al. | |
| 2008/0068351 A1 | 3/2008 | Rosenberg et al. | |
| 2008/0111447 A1 | 5/2008 | Matsuki | |
| 2008/0198139 A1 * | 8/2008 | Lacroix et al. | 345/173 |
| 2008/0296072 A1 | 12/2008 | Takashima et al. | |
| 2008/0303782 A1 * | 12/2008 | Grant et al. | 345/156 |
| 2009/0002328 A1 * | 1/2009 | Ullrich et al. | 345/173 |
| 2009/0209104 A1 | 8/2009 | Kimura | |
| 2009/0290732 A1 * | 11/2009 | Berriman et al. | 381/182 |

OTHER PUBLICATIONS

Takaaki Nara, et al., An Application of Saw to a Tactile Display in Virtual Reality, IEEE Ultrasonics Symposium, 2000, pp. 1-4.
Masaya Takasaki, et al., A Surface Acoustic Wave Tactile Display with Friction Control, IEEE 2001, pp. 240-243.
E.K. Dimitriadis, et al., Piezoelectric Actuators for Distributed Vibration Excitation of Thin Plates, Journal of Vibration and Acoustics, 1991, vol. 113, pp. 100-107.
E.O.J. Salbu, Compressible Squeeze Films and Squeeze Bearings, Journal of Basic Engineering, 1964, pp. 355-366.
M. Wiesendanger, U. Probst, R. Siegwart, Squeeze film air bearings using piezoelectric bending elements, Proceedings of the Fifth International Conference on Motion and Vibration Control (MOVIC2000), Sydney, Australia, 2000, pp. 181-186.
Minsky, Feeling and Seeing: Issues in Force Display, Symposium on Interactive 3D Graphics, Proceedings of the 1990 symposium on interactive 3D graphics, Snowbird, Utah, pp. 235-243, 270, 1990.
Hagood, Damping of Structural Vibrations with Piezoelectric Materials and Passive Electrical Networks, Journal of Sound and Vibration, 146 (2), 1991, pp. 243-268.
Bolanowski,Four Channels Mediate the Mechanical Aspect of Touch, J. Acoust. Soc. Am., 84 (5) Nov. 1988, 1680-1694.
Nara, Surface Acoustic Wave Tactile Display, 2001 pp. 56-63.
Robles-De-La-Torre, Force can overcome object geometry in the perception of shape through active touch, Nature, 412: 445-448, Jul. 2001.
Robles-De-La-Torre, Comparing the role of lateral force during active and passive touch: Lateral force and its correlates are inherently ambiguous cues for shape perception under passive touch conditions, Proc. of Eurohaptics, University of Edinburgh, UK, pp. 159-164, 2002.
Biggs, Haptic Interfaces, Chapter 5, pp. 93-115, Published by Lawrence Erlbaum Associates, 2002.
Levesque, Experimental evidence of lateral skin strain during tactile exploration, Proc. of Eurohaptics, Dublin, Ireland, Jul. 2003.
Yamamoto, Electrostatic tactile display for presenting surface roughness sensation, pp. 680-684, Dec. 2003.
Pasquero, Stress: A practical tactile display system with one millimeter spacial resolution and 700 Hz refresh rate, Proc. of Eurohaptics, Dublin, Ireland, pp. 94-110, Jul. 2003.
Moheimani, A Survey of Recent Innovations in Vibration Damping and Control Using Shunted Piezoelectric Transducers, IEEE Transactions on Control Systems Technoogy, vol. 11, No. 4, Jul. 2003, pp. 482-494.
Takasaki, Transparent surface acoustic wave tactile display, Intelligent Robots and Systems, 2005, (IROS 2005), 2005 IEEE/RSJ International Conference, pp. 3354-3359, Aug. 2005.
Glassmire, Study and Design of a Variable Friction Haptic Display, Thesis [online], May 13, 2006, [retrieved on Dec. 4, 2010]. Http://lims.mech.northwestern.edu/papers/glassmire06/GlassmireMaster.pdf.
Winfield, T-PaD: Tactile pattern display through variable friction reduction, World Haptics Conference, pp. 421-426, 2007.
Winfield, A Virtual Texture Display using Ultrasonically Vibrating Plates, Paper [online], Nov. 2007, [retrieved on Dec. 4, 2010]. Http://vroot.org/node/4707.
Biet, Implementation of tactile feedback by modifying the perceived friction, European Physical Journal Appl. Phys., 43:123-135, 2008.
Melisande Biet et al., Discrimination of Virtual Square Gratings by Dynamic Touch on Friction Based Tactile Displays, Symposium on Haptic Interfaces for Virtual Environments and Teleoperator Systems, 2008, pp. 41-48.
Mallinckrodt, E., et al., Perception by the Skin of . . . Vibrations, Science 1953, 118 (3062): pp. 277-278.
M. Strong and D. E. Troxel, "An electrotactile display," IEEE Trans. Man-Mach Syst., vol. MMS-11, No. I, p. 72-79, 1970.
S. Grimnes, "Eiectrovibration, cutaneous sensation of microampere current," Acta. Physio/. Scand., vol. 118, No. I, pp. 19-25, Jan. 1983.
Kaczmarek, et al., Electrolactile and vibrotactile displays for sensory substitution systems. IEEE Transactions on Biomedical Engineering, 1991, 38(1), pp. 1-16.
Minsky; "Computational Haptics: The Sandpaper System for Synthesizing Texture for a Force- Feedback Display"; PhD Thesis; Massachusetts Institute ofTechnology, Cambridge, MA, Jul. 6, 1995, pp. 1-217.
Tang, H. and D. Beebe, A microfabricated electrostatic haptic display for persons with visual imairments. IEEE Transactions on Rehabilitation Engineering, 1998. 6(3): pp. 241-248.
Reznik. D; Canny, J, (1998). A flat rigid plate is a universal planar manipulator. In IEEE International Conference on Robotics and Automation.
K. Kaczmarek, K. Nammi, A.K. Agarwal, M.E. Tyler, S.J. Haase, and D.J. Beebe. "Polarity effect in electrovibration for tactile display." IEEE Trans on Biomedical Engineering, 53(10):2047-2054, 2006.
K. Kaczmarek, "Electrotactile Display . . . Report," National Eye Institute grant 5-ROI-EY10019-08, Dec. 23, 2004.
D. Wang, K. Tuer, M. Rossi, and J. Shu, "Haptic overlay device for flat panel touch displays," in Symposium on Haptic Interfaces for Virtual Environment and Teleoperator Systems, 2004.

* cited by examiner

Fig. 1a

1st mode — Fig. 1b

Nodal Line
2nd mode — Fig. 1c

Nodal Line
3rd mode — Fig. 1d

VIBRATING SUBSTRATE FOR HAPTIC INTERFACE

This application is a continuation-in-part of application Ser. No. 11/726,391 filed Mar. 21, 2007, and claims benefits and priority of provisional application Ser. No. 61/070,212 filed Mar. 20, 2008, wherein the entire disclosures of both applications are incorporated herein by reference.

CONTRACTUAL ORIGIN OF THE INVENTION

This invention was made with government support under Grant/Contract IIS-0413204 awarded by the National Science Foundation. The Government has rights in the invention.

FIELD OF THE INVENTION

The invention relates to haptic devices and, more particularly, to a haptic device having a substrate and one or more actuators for vibrating the substrate in a multiplicity of higher resonant modes, each of which has a high enough frequency to be inaudible and high enough amplitude to create a friction reduction effect at a plurality of vibrating regions on the substrate surface.

BACKGROUND OF THE INVENTION

Solid state interface devices, such as touch pads and touch screens, are popular and in use on a wide variety consumer electronic products and motor vehicle systems. However, these solid state interface devices typically fail to provide a user with any form of tactile feedback as a result of their solid state nature. The human user of the interface device therefore is not able to experience haptic sensations that assist and inform the user during interaction with the interface device.

There is a need for human interface devices for electronic devices used in motor vehicles, computers, music players, telephones and myriad other electronic devices. For example, modern motor vehicles, especially automobiles but also aircraft, trains and watercraft, contain very complex interfaces. Drivers/pilots need to manage vast amounts of data: vehicle status (e.g., speed, engine speed, cruise control status), climate control, entertainment, communications, navigation, etc. This has the dual effects of leading to very complex instrument panels and requiring significant visual attention, which should be focused on the road or path ahead.

One approach to mitigating these dual effects is the use of haptic feedback. For instance, the iDrive used in some BMW motor vehicles comprises a single knob that controls up to 700 vehicle functions. The haptic feel and behavior of the knob are under computer control and are programmed to be context sensitive.

For instance, the knob can be made to feel and act like a tuning controller for a radio station or like a temperature adjust for a climate control system. The iDrive has numerous drawbacks as well. For instance, it uses a menu system that can be difficult to learn as well as distracting to use, and it offers only one haptic degree of freedom (turning of the knob) such that it fails to exploit the human ability to move in higher dimensional spaces.

T. Watanabe and S. Fukui in "A method for controlling tactile sensation of surface roughness using ultrasonic vibration", in Proc. IEEE International Conference on Robotics and Automation, Nagoya, Japan (1995) describe a device based on variable friction generated by bulky ultrasonic Langevin-type vibrators wherein the user's finger moves in one dimension along the display surface with no finger position or other feedback.

Nara et al. in "Surface acoustic wave tactile display", Computer Graphics and Applications, IEEE, (2001), pp. 53-56, describe a device based on variable friction with one-dimension finger feedback, but the device requires the user's finger to interact with a steel ball slider on the display in a manner that filters the haptic effect.

U.S. Pat. No. 7,148,875 discloses a haptic feedback device for touchpads and other touch controls wherein haptic feedback is provided by direct application of a force or motion to a touch surface in a manner that the user's finger can feel the force or motion. To this end, one or more actuators are coupled to the touchpad to apply a force directly to its surface. In one embodiment, the actuator can comprise a piezoelectric actuator, a voice coil, a pager motor, or a solenoid coupled to the touchpad.

Copending application U.S. Ser. No. 11/726,391 filed Mar. 21, 2007, of common assignee discloses haptic devices that can provide indirect haptic feedback and virtual texture sensations to a user by modulation of friction of a touch surface of the device in response to one or more sensed parameters and/or in response to time (i.e. independent of finger position). The sensed parameters can include, but are not limited to, sensed position of the user's finger, derivatives of sensed finger position such as velocity and/or acceleration, direction of motion of the finger relative to the surface, and/or sensed finger force or pressure on the surface. The touch surface is adapted to be touched by a user's bare finger, thumb or other appendage and/or by an instrument such as a stylus held by the user.

SUMMARY OF THE INVENTION

The present invention provides in an embodiment a haptic device having a substrate with a touch surface and one or more actuators for vibrating the substrate in a multiplicity of higher resonant modes, each of which has a high enough frequency to be inaudible and a high enough amplitude to create a friction reduction effect at a plurality of vibrating regions on the substrate surface.

The present invention provides in another embodiment a haptic device having a substrate with a touch surface and one or more actuators for vibrating the substrate in one or more higher resonant modes in a manner to establish an "n×m" multimodal pattern on the substrate surface wherein n is greater than 1 and m is greater than 1, wherein some of the nodal lines of the pattern intersect, and wherein the resonant frequency is high enough to be inaudible and the amplitude is high enough to create a friction reduction effect at a plurality of vibrating regions defined by nodal lines.

In an illustrative embodiment of the invention, the one or more actuators (e.g. vibrators) is/are disposed away from the nodal lines so as not to straddle a nodal line. For example, the one or more actuators (vibrators) is/are disposed between nodal lines such as, for example, at the center of a respective vibrating region.

In another illustrative embodiment of the invention, the one or more vibrators is/are vibrated concurrently at two or more different resonant frequencies of the substrate. Dead spots of zero vibration corresponding to intersection of nodal lines are thereby avoided or minimized.

In still another illustrative embodiment of these invention, the one or more actuators is/are alternately vibrated at one of two or more different resonant frequencies of the substrate. Dead spots of zero vibration corresponding to intersection of nodal lines are thereby avoided or minimized. To control which resonant frequency is in use, the haptic device can further include a finger or stylus position sensor and a control device to change resonant frequency mode of oscillation from one mode to another in response to a sensed position of a user's appendage (e.g. finger or stylus held by a user) proximate a nodal line on the substrate surface.

In a further illustrative embodiment of the invention, the substrate is transparent such that a graphical display associated with (e.g. beneath) the substrate can be seen through the substrate touch surface. The haptic device can include a bezel housing overlying the transparent surface in a manner to hide the one or more actuators from view. The one or more actuators can be attached to the substrate directly, or they can be positioned to vibrate the substrate indirectly by being connected to a substrate support or disposed between the substrate and a substrate support.

In still another illustrative embodiment of the invention, the haptic device includes a mounting structure on which the substrate is supported by mounting elements at (proximate) certain selected locations corresponding to ends of the nodal lines at edges of the substrate where there is little or no substrate displacement. The mounting elements can comprise flexure elements that can twist along a long axis thereof. The mounting elements can provide support of the substrate at least three locations corresponding to ends of the nodal lines where there is no substrate displacement.

Alternately, in another embodiment of the invention, the haptic device includes about its perimeter an inner mounting frame connected to an outer mounting frame by flexure elements that can twist along their long axis. The mounting frame(s) can form a dust-resistant haptic device enclosure to avoid dust entry into the device.

The present invention also envisions a method of controlling a haptic device that includes imparting vibration (oscillation) to a substrate in a multiplicity of higher resonant modes in alternate manner or concurrently wherein each mode has a high enough frequency to be inaudible and high enough amplitude to create a friction reduction effect at a plurality of vibrating regions on the substrate touch surface.

The present invention also envisions a method of controlling a haptic device that includes imparting vibration (oscillation) to a substrate in one or more higher resonant modes in a manner to establish an "n×m" multimodal pattern on the substrate surface wherein n is greater than 1 and m is greater than 1 and wherein there are some intersecting nodal lines. The resonant frequency is controlled high enough to be inaudible and the amplitude is controlled high enough to create a friction reduction effect at a plurality of the vibrating regions defined by the nodal lines.

The invention further provides a method of supporting a haptic device having a substrate with a touch surface and one or more actuators for vibrating the substrate, comprising supportively connecting mounting elements of a mounting structure to the substrate proximate multiple locations corresponding to ends of nodal lines.

The above features and advantages of the present invention will become apparent from the following detailed description taken with the following drawings.

DETAILED DESCRIPTION OF THE INVENTION

Figure 2:
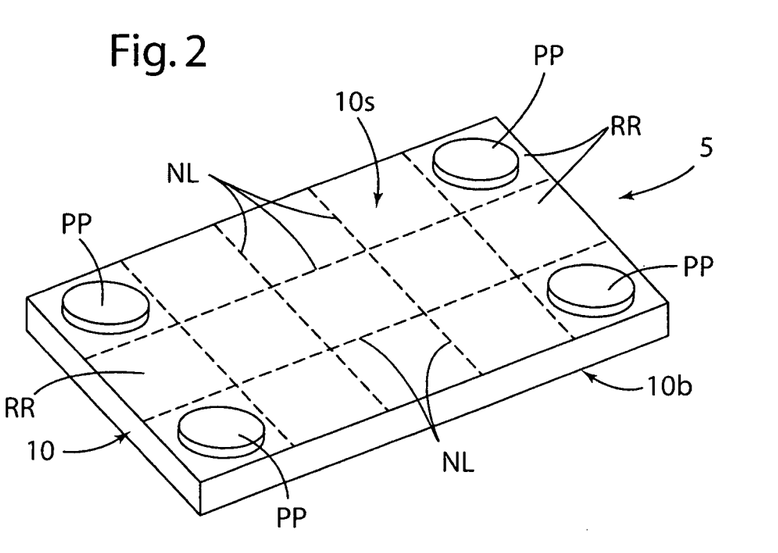
FIG. 2 is a perspective schematic view of a rectangular substrate having a touch surface and having four circular piezoelectric actuators bonded to its surface at the corners thereof to provide the '5-3' resonance multimodal pattern shown when the actuators are energized. The dashed lines represent nodal lines where the amplitude of vibration is zero.

The present invention involves a variable friction haptic device 5 of the illustrative type shown in FIG. 2 having a substrate 10 with a touch surface 10s and one or more vibrators PP operably associated with the substrate in a manner to impart vibration (oscillation) thereto at an amplitude and resonant frequency effective to establish a plurality of distinct vibrating regions RR on the touch surface. The distinct vibrating regions exhibit reduced friction as felt by a user's appendage (user's fingertip or stylus held by a user) as described in copending application U.S. Ser. No. 11/726,391 filed Mar. 21, 2007, of common assignee, the disclosure of which is incorporated herein by reference. The distinct vibrating regions RR are defined by intersecting nodal lines NL resulting from vibration of the substrate at an amplitude and resonant frequency of higher mode. Amplitude of vibration is greatest at the center of each distinct region RR. An illustrative embodiment of the present invention provides a variable friction haptic device that addresses factors that include 1) the capability to provide different touch surface areas for different use applications such as, in particular, the need for larger touch surface areas for use with large-scale haptic devices, 2) the need for thinner substrates, 3) the need for vibrations of the touch surface of sufficient amplitude to produce friction reduction, 4) the desire for vibrations preferably at a high enough frequency so that they are inaudible to a user (e.g. typically above 20 kHz, although it is preferable for the vibrations to be above 40 kHz so that the first subharmonic, which occurs at half the fundamental frequency, is itself inaudible), and 5) the desire for transparent substrate that enables the haptic device to be placed over a graphical display.

Generally, in order to obtain high amplitude, the haptic device 5 must be vibrated at or near a resonant frequency. The resonant frequencies, however, depend on the size of the device, and, as a general rule, larger and thinner devices have lower resonant frequencies. More specifically, the resonant frequency associated with a given mode of vibration moves to a lower frequency as the structure (e.g. substrate) of the haptic device becomes larger in length and width or smaller in thickness. The present invention accommodates the size of the haptic device by vibrating the touch surface in a higher mode, meaning a mode associated with a resonant frequency greater than the first or fundamental mode. By using higher resonant frequency modes, it is possible to achieve sufficient vibration amplitude at sufficiently high frequencies.

Figure 1A:
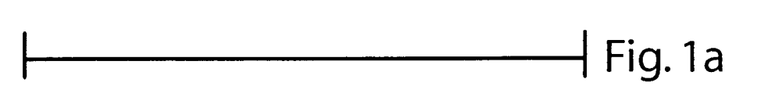
FIG. 1a shows a string stretched between two points.
Figure 1B:
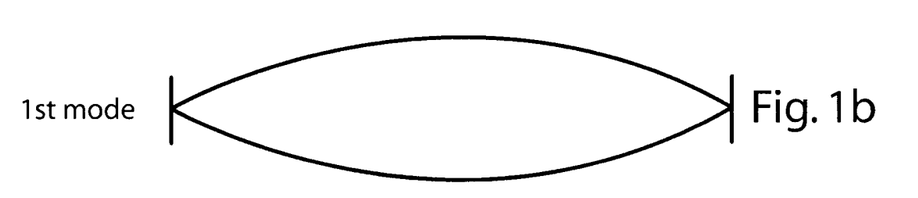
FIG. 1b shows a 1st resonant mode; i.e. an illustration of the mode shape at the lowest resonance frequency. The string actually vibrates up and down. What is shown is the envelope of all possible string locations in space.
Figure 1C:
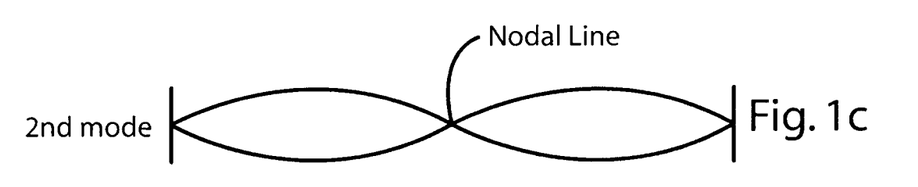
FIG. 1c shows a 2nd resonant mode: mode shape at the next-lowest resonant frequency.
Figure 1D:
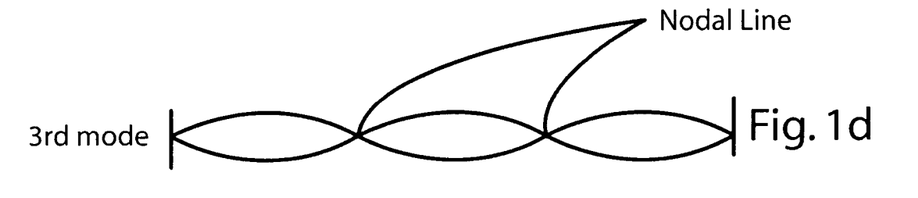
FIG. 1d shows a 3rd mode; i.e., the pattern of adding nodal lines (or, in this string analogy, nodal points) continues.

FIGS. 1a-1d illustrate the meaning of higher resonant frequency modes with a simple, one-dimensional structure: a string stretched between two points, FIG. 1a. The first, second and third modes are illustrated in FIGS. 1b, 1c, and 1d. As the mode number increases, the number of peaks increases, the number of nodal lines increases, and (not illustrated) the frequency of oscillation increases. The same basic features are true of real three-dimensional structures.

Because operation in a higher mode implies the existence of nodal lines (or, in the string analogy, nodal points), and the friction reduction effect is reduced in their vicinity, the invention provides methods for maintaining high performance even in the presence of nodal lines. Embodiments of these methods require the availability of multiple modes, each capable of producing effective friction reduction. For this reason and purposes of illustration, an explanation is now provided as to how to design a vibrating plate capable of friction reduction in more than one resonant mode.

The ability of a vibrating plate to generate friction reduction effect relates to the nondimensional "squeeze number" (C) that has been derived by Salbu [E. O. J. Salbu, "Compressible Squeeze Films and Squeeze Bearings," ASME Journal of Basic Engineering, June 1964, pp 355-366]:

$$\sigma = \frac{12\mu_{air}R_f^2}{p_{atm}}\frac{\omega}{\Delta^2} \qquad (1)$$

Where $\mu_{air}$ is the viscosity of air, $R_f$ is the radius of the finger-surface contact patch, $p_{atm}$ is atmospheric pressure, $\omega$ is the frequency of oscillation, and $\Delta$ is the average thickness of the squeeze film. The squeeze number must be beyond a given threshold for air to be captured under the fingertip.

Salbu has also shown that, if the squeeze number is reasonably large, then the average pressure (P) generated by the squeeze film is roughly proportional to the square of vibration amplitude W:

$$P \approx p_{atm}\left(\frac{W}{\Delta}\right)^2 \qquad (2)$$

Note that W is necessarily less than $\Delta$, since the vibration amplitude cannot be greater than the average thickness of the squeeze film.

In the above equations, the two variables that are controlled pursuant to the invention are $\omega$ and W. As can be seen, both should be large. Increasing $\omega$ is necessary to produce a large squeeze number (and also the frequency is to be well into the ultrasonic range so that the vibrations are inaudible). Increasing W produces higher pressure, as needed to support the user's appendage (e.g. finger or stylus).

It should be understood that these equations both represent idealized situations that will not exist in practice, but that the need for simultaneous high frequency ($\omega$) and high vibration amplitude (W) is clearly observed in practice. Typical values would be $\omega$=40 kHz, and W=2.5 µm.

Figure 1E:
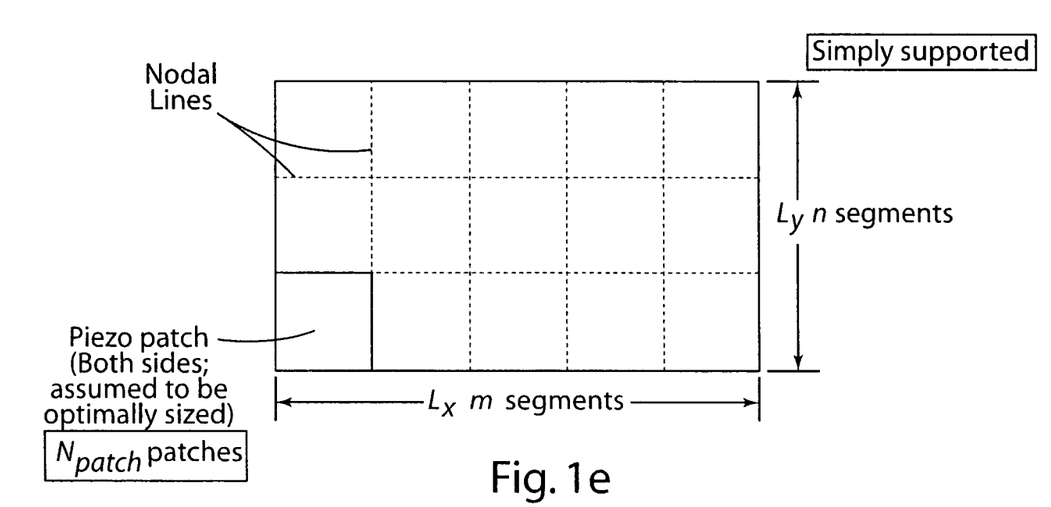
FIG. 1e shows a schematic view of a substrate surface having an "n×m" multimodal pattern of nodal segments defined by intersecting nodal lines established on the substrate surface by energization of piezo patches (piezoelectric actuators) at a peripheral corner thereof.
Figure 1F:
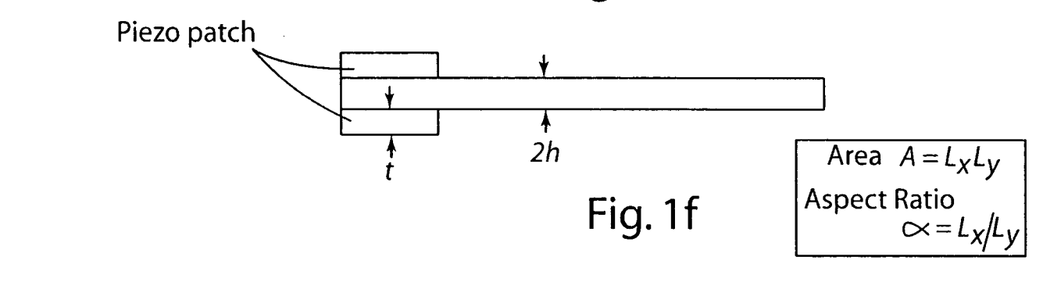
FIG. 1f shows a schematic elevation of the substrate of FIG. 1e with two piezoelectric elements top and bottom, although there could equally well be just one of these.

Now, for purposes of illustration, consider a rectangular plate vibrating in the m×n mode, and actuated by pair of rectangular piezoelectric patches, one on each side of the plate, as shown below. FIGS. 1e, 1f show a single pair of patches, but we will assume that there may be $N_{patch}$ pairs, all working in concert. We will also assume that the plate is simply supported, meaning that the plate is held, but allowed to bend, at the edge. The natural frequency of this mode of oscillation and the peak amplitude of vibration may be expressed as follows:

$$\omega_{mn} = \left[\frac{h(m^2/\alpha + n^2\alpha)}{A}\right]\sqrt{\frac{\pi^4 E_g}{3\rho_g(1-v_g^2)}} \qquad (3)$$

$$W_{mn} = \frac{24}{\pi^4}(1-v_g)^2[C_o'][Q]\left[\frac{h(m^2/\alpha + n^2\alpha)}{A}\right]^{-1}\left[\frac{N_{patch}}{mn}\right]\left[\frac{d_{31}V}{t}\right] \qquad (4)$$

For example, see Dimitriadis et al. [E. K. Dimitriadis, C. R. Fuller, and C. A. Rogers, "Piezoelectric Actuators for Distributed Vibration Excitation of Thin Plates," ASME Journal of Vibration and Acoustics, Vol. 113, 1991, pp. 100-107].

Some parameters of the above equations are defined in FIGS. 1e and 1f where nodal lines and nodal segments n and nodal segments m are illustrated. The others are:

$E_g$ elastic modulus of the plate
$\rho_g$ density of the plate
$v_g$ Poisson's ratio for the plate
$C_o'$ coupling factor less than unity, determined by physical and geometric properties of the piezoelectric patch and the plate
$d_{31}$ piezoelectric coupling constant, in units of (strain/electric field).
V peak voltage applied to piezo
Q quality factor for the plate vibrations The expression for natural frequency shows that, for a given plate material (e.g., glass), the only way to increase $\omega$ is to increase the term:

$$\left[\frac{h(m^2/\alpha + n^2\alpha)}{A}\right] \qquad (5)$$

Unfortunately, the inverse of this term shows up in the equation for $W_{mn}$. In other words, the very things that can be done to increase natural frequency will decrease vibration amplitude. Fortunately, there are other ways to increase vibration amplitude. One can increase voltage to the piezoelectric patches or add more piezoelectric patches, or one can add piezoelectric patches on both sides. Although possible, increasing voltage is not a highly desirable approach since doing so can complicate electronics, increase electrical interference with other electronics, increase heating of the haptic device, and create a risk of electrical shock. Adding more piezoelectric patches increases cost and consumes plate area that might be used for other purposes. A preferred option is to increase the quality factor, Q. Q is related to the amount of energy dissipation in the system, and Q can be increased by eliminating sources of energy loss. For instance, it is helpful to select a high-Q plate material, such as glass. It is also helpful to provide a mounting mechanism that does not couple significant amounts of plate energy into the rest of the system as described below with respect to several novel flexure mounting structures.

To meet the goal of having two or more modes with acceptable frequency and amplitude, it is necessary to choose m and n carefully. For instance, by way of illustration, suppose that a given plate with an aspect ratio of $\alpha=1.6$ has material and geometric properties such that the resonant frequency with m=5 and n=3 is $\omega_{5,3=30}$ kHz. Suppose further that the amplitude of vibration in this mode is $W_{5,3}=2.5$ µm. This frequency and amplitude should produce a strong friction reduction effect and still be inaudible. The Table below shows the natural frequencies in kHz and amplitudes in microns that are determined for several other resonant modes. If we accept only those that have a natural frequency above 25 kHz and an amplitude above 2.0 µm, then there are 5 acceptable modes out of the 25 candidates considered. For example, m/n of 3/4, 4/4, 5/3, 6/2, and 6/3.

TABLE

| m | N | nat freq | Amp |
|---|---|----------|-----|
| 3 | 3 | 20.00833 | 3.748439 |
| 3 | 4 | 31.199   | 2.403923 |
| 3 | 5 | 45.58701 | 1.645205 |
| 3 | 6 | 63.17236 | 1.187228 |
| 3 | 7 | 83.95504 | 0.893335 |
| 4 | 2 | 16.38634 | 4.576982 |
| 4 | 3 | 24.37968 | 3.076332 |
| 4 | 4 | 35.57036 | 2.108497 |
| 4 | 5 | 49.95837 | 1.50125 |
| 4 | 6 | 67.54371 | 1.110392 |
| 4 | 7 | 88.32639 | 0.849123 |
| 5 | 1 | 17.21066 | 4.357765 |
| 5 | 2 | 22.00666 | 3.408059 |
| 5 | 3 | 30       | 2.5 |
| 5 | 4 | 41.19067 | 1.8208 |
| 5 | 5 | 55.57868 | 1.349438 |
| 5 | 6 | 73.16403 | 1.025094 |
| 5 | 7 | 93.94671 | 0.798325 |
| 6 | 1 | 24.07993 | 3.114627 |
| 6 | 2 | 28.87594 | 2.597318 |
| 6 | 3 | 36.86928 | 2.034214 |
| 6 | 4 | 48.05995 | 1.560551 |
| 6 | 5 | 62.44796 | 1.201 |
| 6 | 6 | 80.03331 | 0.93711 |
| 6 | 7 | 100.816  | 0.74393 |

It should be understood that this is merely a hypothetical example, and that actual natural frequencies and vibration amplitude depend critically on such details as material properties and mounting configuration, and therefore should be measured or determined empirically. The point is, however, that it should be possible to identify two or more modes that exhibit both a high enough frequency and a high enough amplitude. Moreover, each of these modes will have a different pattern of nodal lines.

Also, although a suitable mode exists, it may not be possible to excite it strongly unless the piezoelectric actuators are positioned appropriately. The analysis above assumed optimal positioning of the piezoelectric patch, which occurs when the edges of the piezoelectric element lie on the nodal lines. However, a piezoelectric element so positioned for a particular mode will not be optimally positioned for any other resonant mode. In practice, it is often possible to reduce the size of the piezoelectric element and still achieve strong excitation of the mode. Patches that are undersized and placed at the corner of the substrate, like the one shown in FIGS. 1e and 1f, will generally be able to drive most of the resonant modes successfully in practice of embodiments of the invention. An alternative embodiment to practice the invention, however, is to use one piezoelectric patch for each resonant mode to be excited.

Once it is possible to excite multiple resonant modes with adequate frequency and amplitude, it may be desirable to use that ability to keep the user's fingertip away from nodal lines in use of the haptic device. For purposes of illustration and not limitation, two methods or strategies may be used.

Strategy 1: excite two or more different resonant modes simultaneously (e.g. energize piezoelectric actuators at two or more different voltages to this end)

Strategy 2: switch between two or more resonant modes

With regard to strategy 2, the control algorithm for switching between two or more resonant modes using a control unit such as CU shown in FIG. 3 can be as follows:

In a control loop, do the following:
   Measure the position of the fingertip where "position" here refers to the geometric centroid of the contact patch, as estimated by fingertip position sensors.
   If a resonant mode is currently being excited, compute the minimum distance from the fingertip position to any nodal line for that mode.
   If this distance is below a threshold (i.e., the fingertip is too close to a nodal line), then compute the minimum distance from the fingertip to the nodal lines of the other available resonant modes.
   Switch to exciting the resonant mode with the maximum "minimum distance". Note that it will typically take on the order of a millisecond for one mode to ring down (for vibrations to cease), and it will take on the order of a millisecond for the other mode to ring up. These periods of time are short enough not to be easily perceptible to the fingertip.

The invention envisions a modification to this algorithm which uses the fingertip velocity to estimate when the fingertip can be expected to cross a nodal line and switch modes only when a crossing is imminent. This will prevent some unnecessary mode switching.

The invention also envisions a modification to this algorithm which coordinates mode-switching with the desired friction level to switch modes when the friction is high. This is because high friction corresponds to small or no vibration amplitude. Thus, there is no need to "ring down" a mode before "ringing up" the next mode.

For purposes of illustration and not limitation, FIG. 2 illustrates an exemplary rectangular substrate 10 having a touch surface 10s and having four circular piezoelectric actuators PP bonded to its touch surface 10s at the corners thereof as shown. Proper activation of the piezoelectric actuators PP will cause the substrate to resonate at a resonant frequency mode greater than that of the first or fundamental mode. By way of example, the '5-3' resonance is shown in FIG. 2. The dashed lines represent nodal lines NL where the amplitude of vibration is zero. These nodal lines define or divide the substrate surface 10s into a set of 15 (5×3) distinct vibrating regions RR where the vibration amplitude is maximum at the center of each region RR. The '5-3' resonance pattern shown includes 5 nodal segments along the longitudinal or major axis and 3 nodal segments along the other minor axis of the substrate surface as shown in FIG. 2. As described above, the particular "n×m" pattern of nodal lines and segments established is determined and controlled by the frequency of excitation of the actuators PP.

Although FIG. 2 is described with respect to inducing substrate vibrations via bending moments created by glued-on piezoelectric actuators PP, it will be apparent to one skilled in the art that other forms of actuation are possible in practice of the invention, including, but not limited to, piezoelectric actuators that are mounted between the plate substrate 10 and the support structure therefor. Other forms of actuation can be used in lieu of or in addition to piezoelectric actuators, such as electromagnetic actuators.

A challenge associated with the use of higher resonant frequency modes is that many "nodal lines"; i.e., lines NL where the vibration amplitude is zero, occur. On either side of a nodal line NL, the vibrations are out of phase with one another. Thus, if the surface region on one side of the nodal line is moving upwards at a particular instant, the surface region on the other side is moving down. Because of this, it is generally desirable to place each piezoelectric actuator PP with respect to the nodal lines NL such that the actuator PP does not cross a nodal line and is located between nodal lines. FIG. 2 illustrates an exemplary arrangement that is suitable. In this arrangement, four circular piezoelectric actuators PP are bonded to the vibrating substrate 10 such that the actuator centers each correspond to the center of a vibrating region RR (i.e., a surface region bounded by nodal lines), although in practice of the invention it is not necessary to use more than one piezoelectric actuator even though there will be a multiplicity of vibrating regions RR. However, typically multiple actuators PP can be used as shown in FIG. 2, which serve to increase the vibration amplitude.

The arrangement shown in FIG. 2 has the additional benefit that the piezoelectric actuator or actuators PP do not need to cover the entire surface (either touch surface 10s or bottom surface 10b) of the vibrating substrate 10. This enables a transparent variable friction haptic display to be provided by using a transparent material, such as glass or quartz, for the substrate 10.

Figure 3:
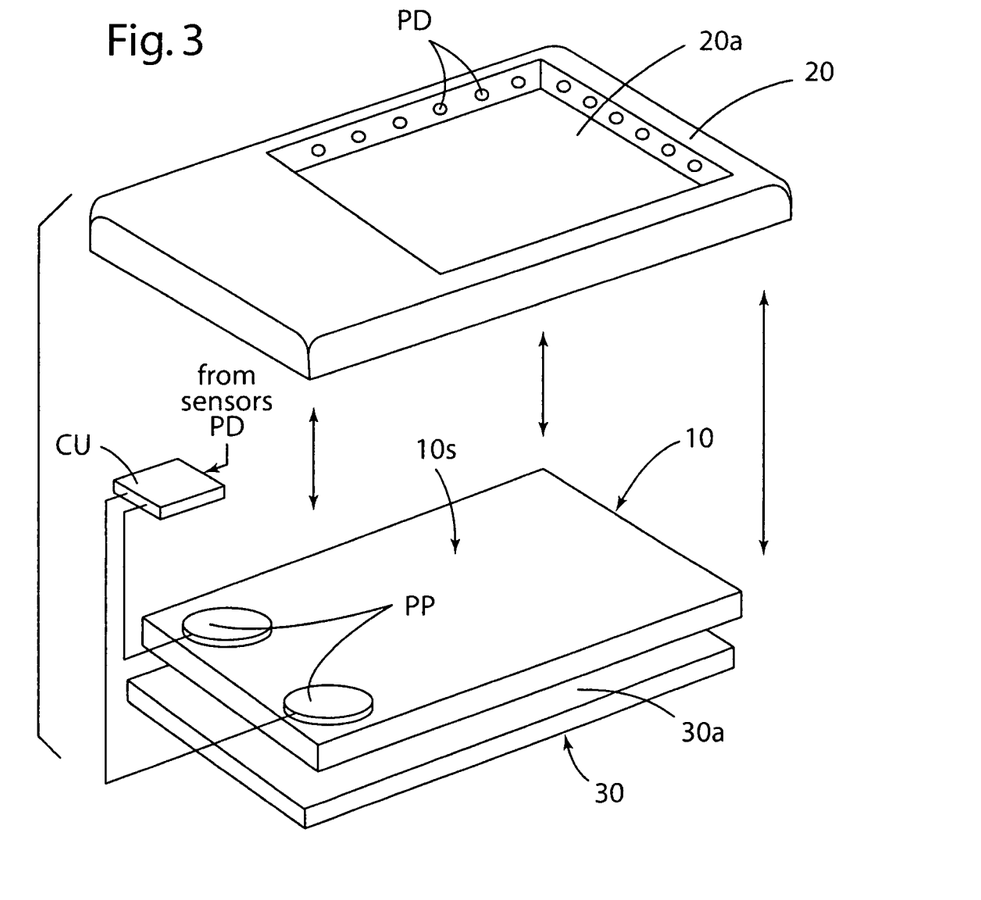
FIG. 3 is an exploded perspective view of a haptic device and graphical display where the haptic device includes a transparent substrate (e.g., glass) with two piezoelectric actuators near one edge and where a bezel housing is placed above the transparent substrate piece hiding the two piezoelectric actuators, but leaving a large transparent region that may be placed above a graphical display.

For purposes of illustration and not limitation, a haptic device arranged as shown in FIG. 3 is possible, in which the piezoelectric actuator(s) PP is/are hidden under a bezel 20 while the glass touch surface 10s is arranged over a graphical display 30. In FIG. 3, the haptic device comprises a transparent substrate (e.g., glass) 10 with two piezoelectric actuators PP near one peripheral or outer edge of the substrate. The bezel housing 20 is placed above the substrate 10 so as to hide the two actuators PP, while leaving a large surface area access opening 20a thereof overlying a large transparent region TR of the substrate, through which opening 20a the touch surface 10s can be accessed and the underlying display 30 viewed. Finger position sensors such as photodiodes PD in a linear sensor array (x-y array) can be disposed on the bezel housing 20 to sense position of the user's finger or stylus for purposes of illustration and not limitation. Alternatively, an infrared touch screen can be used having position sensors thereon to this end. Control unit CU also can be hidden under the bezel housing and connected electrically to the actuators PP and to the finger position sensors PD to provide position feedback to a microprocessor incorporated in or integrated as part of the control unit. Control unit can be powered by a battery (not shown) or other conventional power source.

As mentioned, the transparent haptic device can be placed in front of graphical display 30 and integrated with a fingertip position sensor of a type known in the art (capacitive, resistive, infrared, acoustic, force reaction based, etc.), many of which are described in copending application U.S. Ser. No. 11/726,391 filed Mar. 21, 2007, incorporated herein by reference above. The frictional properties of the substrate touch surface 10s can be coordinated with the graphical objects/images of the display 30 seen through it. Thus, for example, the touch surface 10s may feel smooth and slippery, except for where a virtual button is seen from the underlying graphical display 30. The button may differ in friction level (being more slippery or more sticky), or it may have a texture (spatially varying friction coefficient) as described in the above copending application. The resonant mode employed can be selected such that nodal lines do not cross the virtual button or other virtual representation. Also, the graphical display can be designed so that the virtual button or other representation do not cross the nodal lines.

A great variety of types of graphical display 30 can be used including programmable types (LCD, OLED, CRT, Plasma, etc.), fixed displays (screen printed, laser etched, back lit, etc.), and others. Of course in some embodiments, it is not necessary for a graphical display to be combined with the substrate. Instead the graphical display may be displaced from the substrate, or may be at a different orientation. In some embodiments, a graphical display may not be needed at all.

With respect to the nodal lines NL, it is noted that the vibration amplitude is small in the vicinity of the nodal line. Thus, friction reduction will not occur, or at least will not be as pronounced as it is far from the nodal lines (because the finger pad has finite extent, it always covers at least some region having finite amplitude). In order to minimize or avoid this effect, an embodiment of the invention involves using more than one resonant frequency mode of vibration of the substrate 10 as the user's finger moves on the touch surface 10s near to a nodal line NL. In particular, the mode of vibration is switched as described above to one that does not have a nearby nodal line in response to the fingertip being near or moving toward a nodal line. The fingertip position relative to a nodal line NL can be computed by a computer controller for each of the candidate modes of vibration and switched by the controller as described in copending application U.S. Ser. No. 11/726,391 filed Mar. 21, 2007, incorporated herein by reference above, or other computer controller known in the art. Finger position sensors are described above.

To achieve a high vibration amplitude in practice of the invention, it is desirable to minimize energy dissipation (alternatively, maximize the "quality factor" (Q) of the resonance, commonly known as the Q) of the substrate 10 when it is vibrated Many causes of energy dissipation are possible including, but not limited to, intrinsic dissipation in the substrate and in the piezoelectric elements, ultrasonic acoustic transmission to the air, and coupling from the substrate to the support or frame in which it is held.

Figure 4:
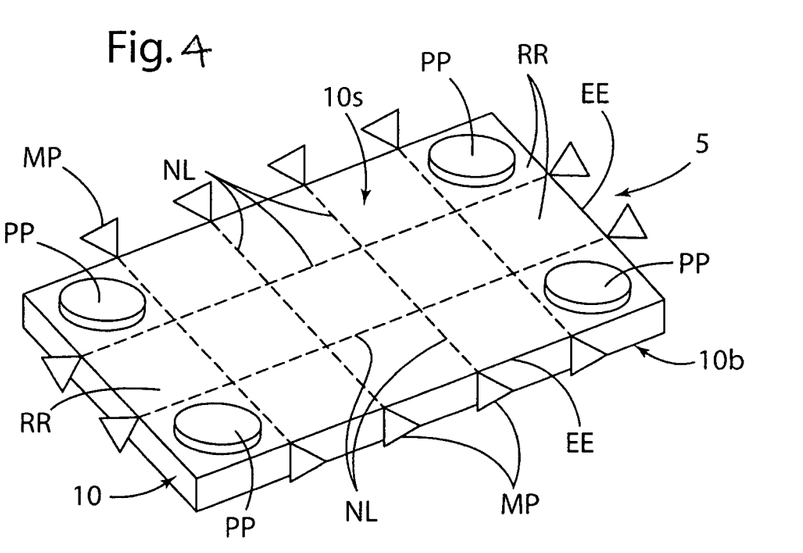
FIG. 4 is a perspective schematic view of a rectangular plate substrate having a touch surface wherein the triangles represent potential substrate mounting points in the vibrational mode illustrated in FIG. 2.

In this regard, another embodiment of the present invention provides a mounting structure that minimizes such energy coupling, thereby keeping as much as the vibrational energy as possible in the substrate 10 itself. One embodiment involves mounting the plate substrate 10 to a frame 50 only at (proximate) the ends EE of the nodal lines NL where there is minimal substrate displacement, as shown in FIG. 4. While the mounting points MP are shown schematically in this figure, they represent three dimensional cones such as being made from hardened screw tips, or hardened balls, that are pressed against the plate substrate 10. Spring-loading also helps to ensure that the mounting points remain pressed against the plate substrate despite manufacturing inaccuracies or thermal expansion. The minimum number of contact points necessary to confine the plate is only three points.

Figure 5:
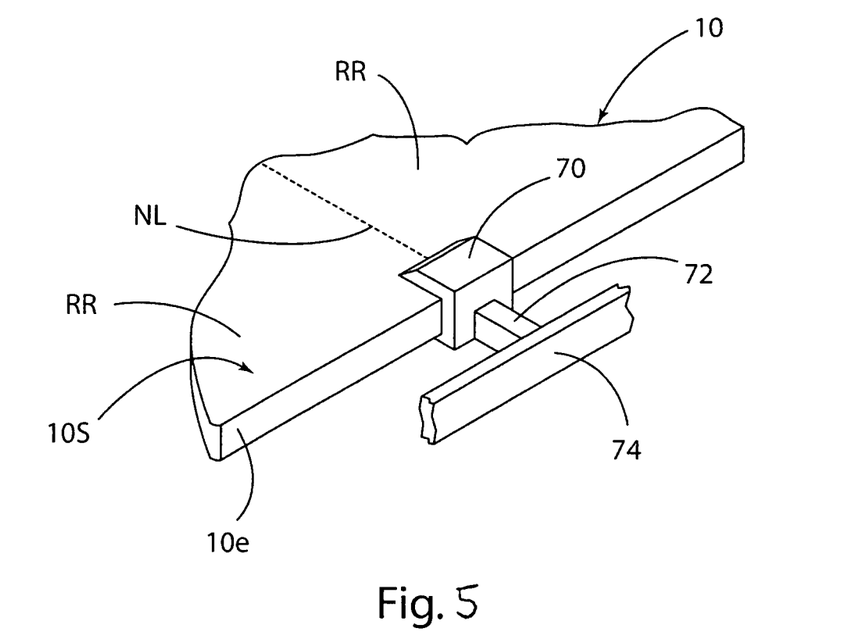
FIG. 5 is a partial perspective schematic view of a rectangular plate substrate mounted by flexure elements that can twist.

As an alternative embodiment to using the pressure contact points shown in FIG. 5, another embodiment of the invention envisions fastening connector elements 70 (one shown) to respective edges (e.g. three or more different edges) of the plate substrate 10 as shown in FIG. 5 where the connector elements 70 can be glued, press fit, clamped, or otherwise fastened. The locations of the connector elements 70 correspond to the ends of the nodal lines NL at the substrate edges 10e where there is minimal substrate displacement. Each connector element 70, in turn, is connected to or formed as part of a flexure element 72 that is connected to or formed as part of perimeter support rail 74 (or other support structure). The flexure element 72 can twist about its long axis that is perpendicular to the edge 10e of the plate substrate 10 to accommodate that the plate substrate does twist through a very small angle at a nodal line, although it does not move up/down at a nodal line. The connector elements, flexure elements, and support rail of FIG. 5 can be molded or formed as one piece or multiple pieces connected together.

Figure 6A:
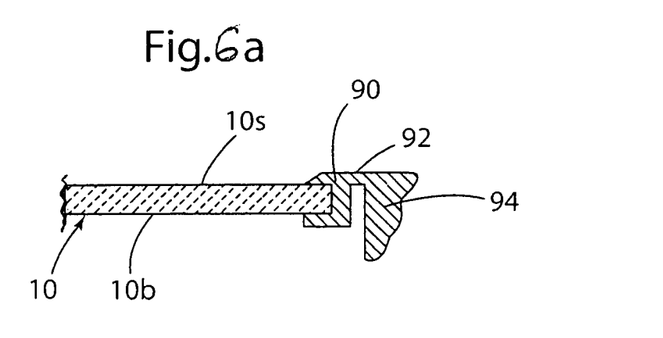
FIG. 6a is a partial sectional schematic view of a portion of a rectangular plate substrate mounted by inner and outer frames with flexure elements between the frames.
Figure 6B:
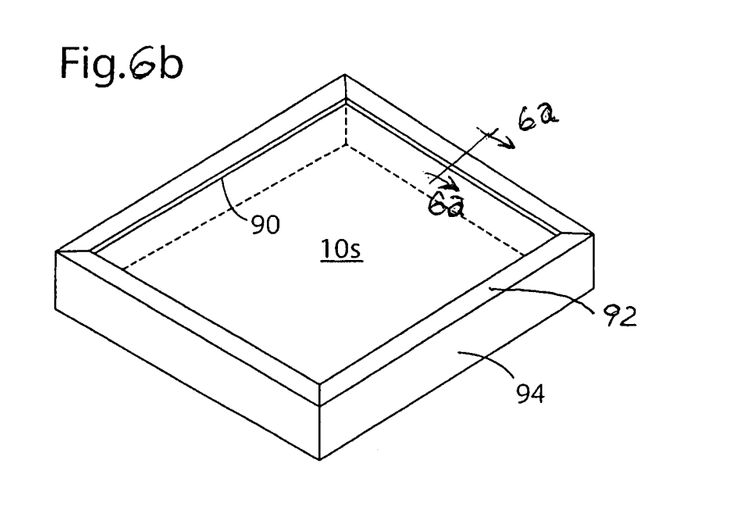
FIG. 6b is a perspective view of the framed substrate.

Not all use applications will permit a nodal line mounting scheme of the type shown in FIG. 5. If, for example, there is a graphical display mounted underneath the haptic device, it will be necessary to keep dust out of the interstitial space between the haptic device and the display. An embodiment of the present invention to accommodate this situation involves mounting the plate substrate 10 around its entire edge, but to do so with a flexure that serves as a "simply supported" boundary condition, as shown in FIGS. 6a and 6b. Referring to FIGS. 6a and 6b, the variable friction haptic display includes a plate substrate 10 whose outer perimeter (part or all) is glued or otherwise fastened in an inner frame 90. The inner frame 90 is connected to an outer support frame 94 by flexure joint elements 92 (three or more can be employed). The flexure elements 92 act somewhat like a hinge joint, permitting fairly free rotation (twisting) at the edges of the plate substrate 10. The flexure element 92 can twist about its long axis that is perpendicular to the edge of the plate substrate 10 to accommodate that the plate substrate does twist through a very small angle at a nodal line, although it does not move up/down at a nodal line. The inner frame, flexure elements, and outer support frame of FIG. 6a, 6b can be molded or formed as one piece or multiple pieces connected together with the frames 90, 94 being configured and cooperating to form a haptic device enclosure that is resistant to dust entry.

Although certain illustrative embodiments of the invention are described hereabove, those skilled in the art will appreciate that changes and modifications can be made thereto without departing from the spirit and scope of the invention as set forth in the appended claims.

REFERENCES

[1] M. Wiesendanger, Squeeze film air bearings using piezoelectric bending elements, Ph.D. dissertation, Ecole Polytechnique Federale de Lausanne, Lausanne, Switzerland, 2001.

[2] T. Watanabe and S. Fukui, "A method for controlling tactile sensation of surface roughness using ultrasonic vibration", in Proc. IEEE International Conference on Robotics and Automation, Nagoya, Japan, 1995.

[3] T. Nara et al., "An application of SAW to a tactile display in virtual reality," in Proc. IEEE Ultrasonics Symposium, 2000.

[4] M. Takasaki et al., "A surface acoustic wave tactile display with friction control," in Proc. IEEE International Conference on Micro Electro Mechanical Systems, 2001.

[5] E. O. J. Salbu, "Compressible Squeeze Films and Squeeze Bearings," ASME Journal of Basic Engineering, June 1964, pp 355-366.

[6] E. K. Dimitriadis, C. R. Fuller, and C. A. Rogers, "Piezoelectric Actuators for Distributed Vibration Excitation of Thin Plates," ASME Journal of Vibration and Acoustics, Vol. 113, 1991, pp. 100-107.

We claim:

1. A haptic device having a substrate with a touch surface and one or more actuators that vibrate the substrate in a multiplicity of higher resonant modes, each of which has a high enough frequency to be inaudible and high enough amplitude to create a friction reduction effect at a plurality of vibrating regions on the substrate touch surface, wherein each of the one or more actuators provides vibration to more than one vibrating region, and wherein at least one of the higher resonant modes forms nodal lines that define vibrating regions on the substrate surface wherein the positions of the nodal lines are dependent upon the frequency of the respective higher resonant mode.

2. The device of claim 1 wherein the one or more actuators is/are disposed between nodal lines.

3. The device of claim 1 wherein one of the actuators is disposed at a center of one of the plurality of respective vibrating regions.

4. The device of claim 1 wherein the substrate is transparent.

5. The device of claim 1 wherein the one or more actuators is/are attached to the substrate.

6. The device of claim 1 wherein the one or more actuators is/are disposed between the substrate and a graphical display.

7. The device of claim 1 wherein the one or more actuators is/are located at one or more peripheral locations of the substrate.

8. The device of claim 1 wherein the one or more actuators is/are located at a peripheral edge or corner of the substrate.

9. The device of claim 1 wherein the one or more actuators comprise a piezoelectric vibrator or electromagnetic actuator.

10. The device of claim 1 wherein the one or more actuators is/are alternately vibrated in one of a plurality resonant frequency modes of the substrate.

11. The device of claim 10 further including a position sensor and a control device to change the resonant frequency mode of oscillation in response to a sensed position of a user's appendage.

12. The device of claim 1 wherein two or more actuators are concurrently vibrated at different resonant frequency modes of the substrate.

13. The device of claim 1 comprising a transparent substrate and a bezel housing overlying the transparent substrate in a manner that hides the one or more actuators from view.

14. The device of claim 1 that includes a mounting structure on which the substrate is supported by mounting elements proximate multiple locations corresponding to ends of the nodal lines where there is little or no substrate displacement.

15. The device of claim 14 wherein the mounting elements comprise flexure elements that can twist about their long axis.

16. The device of claim 15 wherein the flexure elements provide support of the substrate proximate at least three locations corresponding to ends of the nodal lines where there is little or no substrate displacement.

17. The device of claim 1 that includes an inner mounting frame that is disposed about the periphery of the substrate, an outer mounting frame, and flexure elements between the frames that can twist about their long axis.

18. A haptic device having a substrate with a touch surface and one or more actuators for vibrating the substrate in one or more higher resonant modes in a manner to establish a multimodal pattern on the substrate surface wherein the resonant frequency is high enough to be inaudible and the amplitude is high enough to create a friction reduction effect at a plurality of vibrating regions defined by nodal lines, wherein each of the one or more actuators provides vibration to more than one vibrating region and wherein at least one of the higher resonant modes forms nodal lines that define vibrating regions on the substrate surface wherein the positions of the nodal lines are dependent upon the frequency of the respective higher resonant mode.

19. The device of claim 18 wherein the one or more actuators comprise piezoelectric actuators and the actuators are arranged in an "n×m" multimodal pattern on the substrate surface wherein n is greater than 1 and m is greater than 1, and wherein some of the nodal lines of the pattern intersect.

20. A haptic device having a substrate with a touch surface and one or more actuators for vibrating the substrate, wherein each of the one or more actuators provides vibration to more than one vibrating region, wherein the vibration is at a resonant frequency that forms nodal lines that define the vibrating regions on the substrate surface and is high enough to be inaudible and the amplitude is high enough to create a friction reduction effect at a plurality of vibrating regions on the substrate touch surface, and in combination with a mounting structure having mounting elements for supporting the haptic device proximate multiple separate locations corresponding to ends of the nodal lines.

21. The device of claim 20 wherein the mounting elements comprise flexure elements that can twist about their long axis.

22. The device of claim 21 wherein the flexure elements provide support of the substrate proximate at least three locations corresponding to ends of the nodal lines where there is little or no substrate displacement.

23. The device of claim 20 that includes an inner mounting frame that is disposed about the periphery of the substrate, an outer mounting frame, and flexure elements between the frames that can twist about their long axis.

24. A method of controlling a haptic device that includes imparting vibration (oscillation) to a substrate in a multiplicity of higher resonant modes in sequential manner or concurrently wherein each higher resonant mode has a high enough frequency to be inaudible and high enough amplitude to create a friction reduction effect at a plurality of vibrating regions on the substrate touch surface with the location of the plurality of vibrating regions being defined by nodal lines and with the location of the nodal lines and vibrating regions defined by the nodal lines varying based on the higher resonant mode utilized.

25. The method of claim 24 including supporting the substrate by mounting elements spaced apart at certain selected locations corresponding to ends of the nodal lines where there is little or no substrate displacement.

26. The method of claim 24 including supporting the substrate using flexure elements that twist about their long axis.

27. The method of claim 24 including supporting the substrate about its periphery by an inner mounting frame connected to an outer mounting frame by the flexure elements therebetween that twist along their long axis.

28. A method of controlling a haptic device that includes imparting vibration (oscillation) to a substrate in one or more higher resonant modes in a manner to establish a multimodal pattern on a surface of the substrate wherein in a first mode resonant frequency is controlled with one or more actuators so as to be high enough to be inaudible and amplitude is controlled so as to be high enough to create a friction reduction effect at a plurality of vibrating regions defined by nodal lines that are dependent upon the first mode resonant frequency, and further comprising imparting vibration to the substrate at an amplitude and resonant frequency of a higher mode that is greater than the first mode and that is effective to establish on the surface of the substrate a plurality of distinct vibrating regions defined by nodal lines that are dependent upon the resonant frequency of the higher mode, wherein each of the one or more actuators provides vibration to more than one vibrating region.

29. A method of supporting a haptic device having a substrate with a touch surface and one or more actuators for vibrating the substrate, wherein each of the one or more actuators provides vibration to more than one vibrating region, with the vibrating regions being defined by nodal lines having locations that are dependent upon the resonant frequency of the vibration, with the frequency being high enough to be inaudible and the amplitude being high enough to create a friction reduction effect at a plurality of vibrating regions on the substrate touch surface, and comprising supportively connecting mounting elements of a mounting structure to the substrate proximate multiple locations corresponding to ends of the nodal lines.

30. The method of claim 29 wherein the mounting elements comprise flexure elements that can twist about their long axis.

31. The method of claim 30 wherein the flexure elements provide support of the substrate at least three locations corresponding to ends of the nodal lines where there is little or no substrate displacement.

32. The method of claim 29 that includes an inner mounting frame that is disposed about the periphery of the substrate, an outer mounting frame, and flexure elements between the frames that can twist about their long axis.

\* \* \* \* \*